United States Patent Office 3,530,037
Patented Sept. 22, 1970

3,530,037
METHOD FOR SOLUBILIZATION OF COLLAGEN FIBERS WITH PROTEOLYTIC ENZYMES
Tomio Nishihara, 14 Russell Terrace,
Belmont, Mass. 02178
No Drawing. Continuation-in-part of application Ser. No. 411,631, Nov. 4, 1964. This application Mar. 20, 1967, Ser. No. 624,228
Int. Cl. C12d 13/06
U.S. Cl. 195—6
5 Claims

ABSTRACT OF THE DISCLOSURE

An improved method for solubilizing insoluble collagen is disclosed in which proteolytic enzymes of *Aspergillus niger*, ATCC No. 16,513, *Aspergillus saitoi*, ATCC No. 14,332, or *Aspergillus oryzae* are employed.

---

This is a continuation-in-part of my copending application Ser. No. 411,631 filed Nov. 4, 1964, now abandoned.

This invention relates to a method for the solubilization of collagen fibers. The method for solubilization of collagen fibers into a solution while keeping their natural rigid rod-like molecular structure in fiber reconstitutable form is disclosed generally in U.S. Pat. No. 3,034,857, but the collagen fibers of adult animals are solubilized more slowly than those of young animals, and, therefore, in order to solubilize the former easily, special means such as extremely vigorous agitation, etc. are required. The method for solubilization of the collagen fibers of adult animals as easily as in the case of those of young animals is disclosed in U.S. Pat. No. 3,121,049. In this patent application, collagen fibers are denatured by heating in water or treatment with protein-denaturing agents, then the shrunk fibers are cooled to room temperature or the denaturing agents are removed from the fibers in order to renature their amorphous structure to a crystalline one similar to that of native collagen, and, thereafter, the renatured fibers are solubilized by treatment with proteolytic enzymes. This method, however, is complicated by the addition of denaturation-renaturation operation.

The present inventor made researches in respect of enzymes which are capable of dispersing the collagen fibers of adult animals quickly into a solution as fiber-reconstitutable, rigid rod-like molecules without applying the denaturation-renaturation operation. Some very powerful proteolytic enzymes, produced from genus Aspergilli have been found having an excellent ability to solubilize the collagen fibers of adult animals. The enzymes have an optimum pH of about 2 to 3 for milk casein.

By the treatment with proteolytic enzymes in accordance with the present invention, the collagen fibers of adult animals, like those of young animals, can be solubilized easily and quickly into a solution in fiber-reconstitutable form. Such a phenomenon is still difficult to explain in detail. It is considered that the specificity of the new enzymes produced from some new strains of genus Aspergilli would have a striking characteristic to solubilize the animal collagen fibers. In fact, by testing with these enzymes, it was found that the ability thereof to solubilize collagen fibers was the strongest as compared with the case of any other acid proteolytic enzymes hitherto known.

Enzymes which yield the unexpected results of the present invention are found in the fermentation broths of *Aspergilli niger* (ATCC No. 16,513) and *Aspergilli saitoi* (ATCC No. 14,332). Purification techniques for the enzymes of *A. niger* and *A. saitoi* are described in U.S. Pats. Nos. 2,848,371 and 3,149,051 and in German Pat. No. 1,226,975. Other enzymes useful in the present invention may be prepared from *A. oryzae* in the manner described by Nakanishi in "The Journal of Biochemistry," vol. 46, pages 1263–1270 (1959).

To solubilize the collagen fibers by the present invention, it is preferred to use the new acid proteolytic enzyme in an amount of about 0.01 to 2.0% per substrate by weight at about 10° C. to 35° C. and at a pH of about 1.5 to 4.0 for about 24 hours.

The method for solubilization of collagen fibers with these enzymes is explained in detail hereinbelow by means of working examples.

EXAMPLE 1

Fresh adult steer hide was washed with water and further with a 5% saline solution to remove the soluble matters, then unhaired by the enzymic method, and thereafter cut into pieces by a mincer. To 100 g. of the purified minced hide (water content, 70%) was added 1 l. of dilute hydrochloric acid so that the solution pH after equilibration becomes 3. The crude enzyme having an activity of 300,000 units (for casein digestion) obtained from *Aspergillus niger* (ATCC No. 16,513) was added in an amount of 0.5% by weight of the substrate, that is, in an amount of 0.15 g., and the mixture was agitated for 24 hours at 25° C., then the hide collagen fibers were completely solubilized to form a viscous solution. The same results were obtained by using an inorganic acid, such as sulfuric or phosphoric acid, or an organic acid, such as acetic, citric or lactic acid, in place of the hydrochloric acid.

After filtration, the concentration of collagen in the above-mentioned solution was found to be 2.7%, showing that the collagen fibers had almost completely dispersed into the solution. To this solution was added caustic soda or di-sodium phosphate to neutralize the solution to produce fibrous precipitates. These precipitates were washed with water and freeze-dried. Thus, the dry weight of the reconstituted fibers was found to be 29 g., showing that reconstitution of the fibers from solution had been done with the yield of nearly 100%. The reconstituted fibers were dissolved in a dilute acid of pH 3.6, and the measurements of viscosity, flow birefringence, sedimentation constant and specific rotation etc. were made. These observations clearly indicate that said solubilized collagen had retained a rigid-rod structure similar to that of natural collagen molecules. In addition, the electron microscopic examination showed that the reconstituted fibers have the characteristics cross striation having a period of 700 A.

In order to compare the solubilization ability of the present enzymes with that of pepsin, the following experiment was made.

The pepsin used was a pure substance having an activity of 15,000,000 units for milk casein, and, in that case, the pH of hide was adjusted to 2.5 (the optimum pH of pepsin for collagen). In the case of the present new proteolytic enzymes having an activity of 150,000 units for milk casein, the pH of hide was adjusted to 3.0 (the optimum pH of the present proteolytic enzyme for collagen). The amount of the enzyme added was 0.01% per substrate by weight in the case of pepsin and 1.0% in the case of the present enzyme, so that the enzymic treatments by each enzyme were made under the same condition from the viewpoint of the activity for casein. In this examination, the amount of the collagen fibers solubilized in 24 hours' agitation was 20% in the case of pepsin, and 100% in the case of the present enzyme. Accordingly, the enzyme produced from *Aspergillus niger* is superior in the ability to solubilize the collagen fibers of adult steer hide to the proteolytic enzyme hitherto known.

EXAMPLE 2

Adult steer bone was deashed with 1 N hydrochloric acid. The collagen of the deashed bone was then neutralized and washed with water to obtain a sample of 200 g. (water content, 75%), to which 1 l. of dilute acetic acid was added to adjust the pH to 3.0. Thereafter, in the same way as in Example 1, the aforesaid enzyme (produced from *Aspergillus niger*) solution was added in an amount of 0.5% per substrate by weight, and the mixture was agitated for 24 hours at 25° C. to form a viscous solution in which the collagen had been almost dispersed. After filtration, this solution was neutralized to form a fibrous precipitate, the dry weight of which was about 45 g., showing that about 90% of the collagen fibers was solubilized without being destroyed, the ability of reconstitution.

As shown in Examples 1 and 2, it is now clear that when the enzyme described therein is used, the collagen fibers of adult animals can be solubilized as easily as in the case where those of young animals are solubilized with pepsin.

EXAMPLE 3

The procedure described in Example 1 was followed using the proteolytic enzyme produced from *Aspergillus saitoi* (ATCC No. 14,332) in place of the enzyme used in Example 1. In this procedure, the collagen fibers were almost solubilized in 48 hours at about 25° C. and at a pH of about 2.5 to form a very viscous solution. In this case, the above-mentioned enzyme having an activity of 150,000 units for casein was used in an amount of 1% per substrate by weight. The collagen solution obtained by the above treatment had the same characteristics as those of the collagen solution obtained by the procedure in Example 1.

The collagen fiber-solubilizing activity of this enzyme produced from *Aspergillus saitoi* was tested through comparison with that of pepsin. Pure pepsin (having an activity of 15,000,000 units for casein) was used in an amount of 0.01% per substrate by weight; on the other hand, the present crude enzyme (having an activity of 150,000 units for casein) produced from *Aspergillus saitoi* was used in an amount of 1% per substrate by weight, at a pH of about 2.5 and a temperature of about 25° C. for 24 hours. The collagen fibers used were solubilized about 20% with pepsin and about 50% with the present enzyme. Therefore, it can be said that the enzyme produced from *Aspergillus saitoi* showed an excellent activity to solubilize the collagen fibers.

EXAMPLE 4

The procedure described in Example 2 was followed using the proteolytic enzyme produced from *Aspergillus saitoi* in place of the enzyme used in Example 2. In this procedure, the collagen fibers are almost solubilized in 48 hours at a temperature of about 25° C. and at a pH of about 2.8, forming a viscous solution. The amount of the enzyme (having an activity of 150,000 units for casein) used was 1% per substrate by weight. The collagen solution obtained had the same characteristics as those of the collagen solution obtained by the procedure in Example 1.

EXAMPLE 5

The procedure described in Example 1 was followed using the proteolytic enzyme produced from *Aspergillus oryzae* as described in "The Journal of Biochemistry," vol. 46, pages 1263–1270 (1959), in place of the enzyme used in Example 1. In this procedure, the collagen fibers were almost completely solubilized in 36 hours at a temperature of about 25° C. and at a pH of 2.8, to form a viscous solution. The solution had the same characteristics as those of the collagen solution obtained by the procedure in Example 1. The amount of the present proteolytic enzyme (having an activity of 150,000 units for casein) used was 1% per substrate by weight.

The comparison of the solubilizing ability of the present enzyme with that of pepsin was made. Pure pepsin (having an activity of 15,000,000 units for casein) was used in an amount of 0.01% per substrate by weight and, on the other hand, the present proteolytic enzyme produced from *Aspergillus oryzae* (having an activity of 150,000 units for casein) was used in an amount of 1% per substrate by weight, at a pH of 2.8 and a temperature of 25° C. for 24 hours. The amount of the solubilized collagen fibers was about 20% in the case of pepsin and 70% in the case of the proteolytic enzyme produced from *Aspergillus oryzae*, showing that the collagen fiber-solubilizing ability of the latter is excellent.

EXAMPLE 6

The procedure described in Example 2 was followed using the proteolytic enzyme mentioned in Example 5 in place of the enzyme used in Example 2. In this procedure, the collagen fibers were almost completely solubilized in 36 hours at a temperature of about 25° C. and at a pH of about 2.8, to form a viscous solution. The amount of the enzyme (having an activity of 150,000 units for casein) used was 1% per substrate by weight. The collagen solution obtained had the same characteristics as those of the collagen obtained by the procedure in Example 1.

What is claimed is:

1. A method for the solubilization of insoluble collagen fibers into a molecularly dispersed solution having the ability of fiber reconstitution which consists essentially of treating the insoluble collagen fibers with the proteolytic enzymes produced by a member of the group consisting of *Aspergillus niger* ATCC No. 16,513, *Aspergillus saitoi* ATCC No. 14,332, and *Aspergillus oryzae* at a pH between 1.5 and 4 and at a temperature between about 10° and 35° C.

2. A method according to claim 1 wherein said enzymes have an optimum pH of about 2 to 3 for milk casein.

3. A method according to claim 1 wherein said enzymes are produced from *Aspergillus niger* ATCC No. 16,513.

4. A method according to claim 1 wherein said enzymes are produced from *Aspergillus saitoi* ATCC No. 14,332.

5. A method according to claim 1 wherein said enzymes are prepared from *Aspergillus oryzae*.

References Cited

UNITED STATES PATENTS 3,314,861  4/1967  Fujii ------------------ 195—6

ALVIN E. TANENHOLTZ, Primary Examiner